(12) United States Patent
Ito

(10) Patent No.: US 12,551,321 B2
(45) Date of Patent: Feb. 17, 2026

(54) DENTAL INTRAORAL DEVICE AND MANUFACTURING METHOD THEREOF

(71) Applicant: KURARAY NORITAKE DENTAL INC., Kurashiki (JP)

(72) Inventor: Misaki Ito, Tainai (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 263 days.

(21) Appl. No.: 17/777,302

(22) PCT Filed: Nov. 18, 2020

(86) PCT No.: PCT/JP2020/042973
§ 371 (c)(1),
(2) Date: May 17, 2022

(87) PCT Pub. No.: WO2021/100751
PCT Pub. Date: May 27, 2021

(65) Prior Publication Data
US 2022/0401194 A1    Dec. 22, 2022

(30) Foreign Application Priority Data

Nov. 18, 2019 (JP) ................................. 2019-208221

(51) Int. Cl.
*A61C 13/01*    (2006.01)
*A61F 5/56*    (2006.01)

(52) U.S. Cl.
CPC ............... *A61C 13/01* (2013.01); *A61F 5/56* (2013.01)

(58) Field of Classification Search
CPC ......... A61C 13/02; A61C 13/04; A61C 13/06; A61C 13/0003; A61C 13/0004; A61C 13/0018; A61C 13/0019; A61C 13/34; A61C 13/01; A61F 5/56
USPC ..................................... 433/171, 172, 168.1
See application file for complete search history.

(56) References Cited

U.S. PATENT DOCUMENTS

| | | | |
|---|---|---|---|
| 6,604,527 B1 | 8/2003 | Palmisano et al. | |
| 10,932,890 B1 * | 3/2021 | Sant | A61C 13/0004 |
| 2012/0094255 A1 | 4/2012 | Brown | |
| 2012/0215310 A1 | 8/2012 | Sharp et al. | |

(Continued)

FOREIGN PATENT DOCUMENTS

| | | |
|---|---|---|
| CA | 2771317 A1 | 2/2011 |
| CA | 2771384 A1 | 2/2011 |

(Continued)

OTHER PUBLICATIONS

Waltham Dental Center (a dental services provider) [online]. [retrieved Sep. 12, 2024]. Retrieved from the Internet: https://www.walthamdentalcenter.com/Account_Data/Account_374/editor/original_teeth_anatomy_04.pdf (Year: 2024).*

(Continued)

*Primary Examiner* — Eric J Rosen
*Assistant Examiner* — Luis Ruiz Martin
(74) *Attorney, Agent, or Firm* — Element IP, PLC

(57) ABSTRACT

A dental intraoral device that is worn within an oral cavity, the dental intraoral device comprising a resin base portion that follows a shape of the oral cavity. At least a part of the base portion is formed into a mesh shape. The part of the base portion is preferably formed by approximately regularly arranging unit regions having holes.

20 Claims, 13 Drawing Sheets

(56) References Cited

U.S. PATENT DOCUMENTS

| | | |
|---|---|---|
| 2012/0232654 A1 | 9/2012 | Sharp et al. |
| 2016/0081768 A1* | 3/2016 | Kopelman ............... A61C 7/10 433/6 |
| 2017/0056178 A1 | 3/2017 | Sharp et al. |
| 2017/0189140 A9 | 7/2017 | Kuo |
| 2017/0252165 A1 | 9/2017 | Sharp et al. |
| 2017/0367792 A1 | 12/2017 | Raby et al. |
| 2018/0098828 A1* | 4/2018 | Hansen ................... B33Y 80/00 |
| 2018/0235731 A1* | 8/2018 | Hung ....................... A61C 7/08 |
| 2018/0338819 A1* | 11/2018 | Chou ....................... A61C 7/08 |
| 2019/0021820 A1 | 1/2019 | Lucera |
| 2019/0091060 A1 | 3/2019 | Shah |
| 2022/0296410 A1* | 9/2022 | Bilodeau ................... A61F 5/56 |

FOREIGN PATENT DOCUMENTS

| | | | |
|---|---|---|---|
| CN | 102548509 A | 7/2012 | |
| CN | 102573704 A | 7/2012 | |
| CN | 106730036 A | 5/2017 | |
| CN | 206194240 U | 5/2017 | |
| EP | 3498228 A1 | 6/2019 | |
| EP | 3632370 A1 * | 4/2020 | ......... A61C 13/0004 |
| JP | S5643423 B2 | 10/1981 | |
| JP | H08-196551 A | 8/1996 | |
| JP | 2005342133 A | 12/2005 | |
| JP | 2013502283 A | 1/2013 | |
| JP | 2013502285 A | 1/2013 | |
| JP | 2016026025 A | 2/2016 | |
| JP | 2017046793 A | 3/2017 | |
| JP | 2017200630 A | 11/2017 | |
| JP | 2018504191 A | 2/2018 | |
| JP | 2019130286 A | 8/2019 | |
| JP | 2020503919 A | 2/2020 | |
| KR | 10-20120053039 A | 5/2012 | |
| KR | 10-20120065352 A | 6/2012 | |
| KR | 1020140007778 A | 1/2014 | |
| WO | WO-2000001317 A1 | 1/2000 | |
| WO | WO-2011022560 A1 | 2/2011 | |
| WO | WO-2014053549 A1 * | 4/2014 | ......... A61C 13/0004 |
| WO | WO-2014066963 A1 * | 5/2014 | ............... C08K 3/36 |
| WO | WO-2018118200 A1 | 6/2018 | |
| WO | WO-2019068032 A1 | 4/2019 | |

OTHER PUBLICATIONS

Extended European Search Report issued Oct. 19, 2023 in European Patent Application No. 20889463.4, 7 pages.

International Search Report issued Dec. 22, 2020 in PCT/JP2020/042973 (with English translation), 4 pages.

* cited by examiner

FIG.1
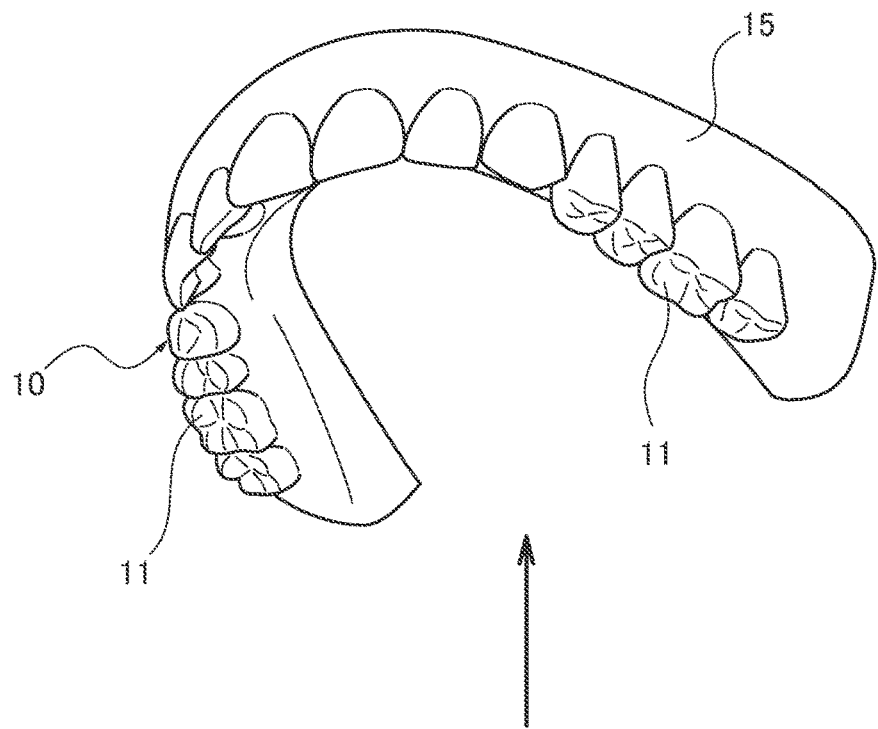
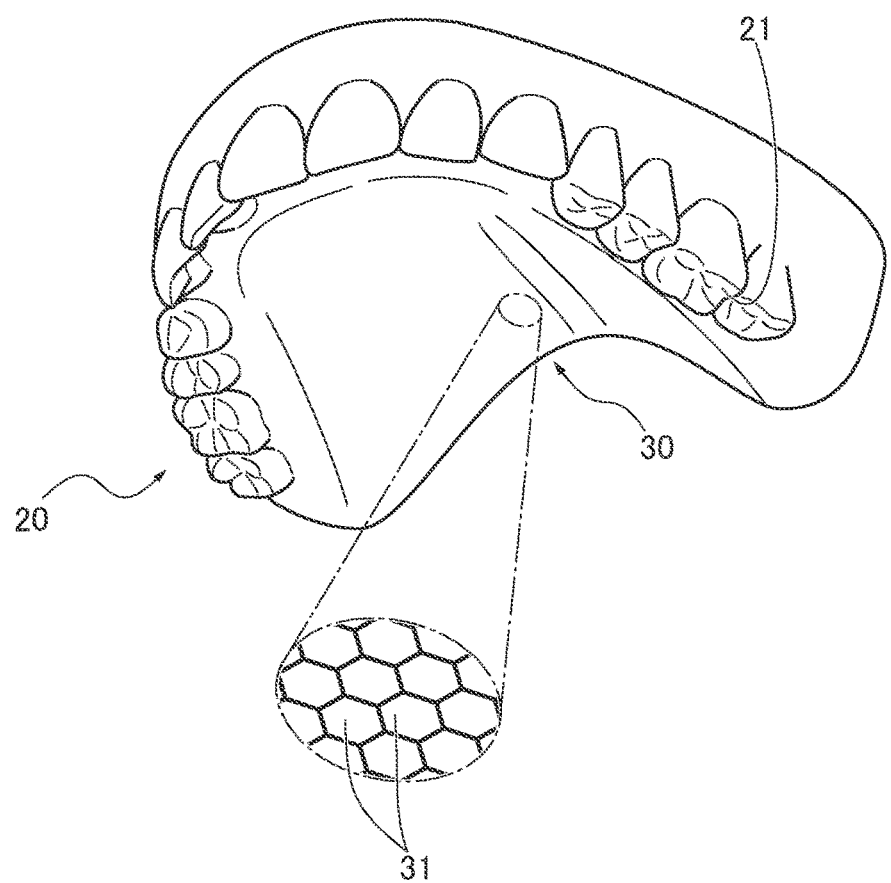

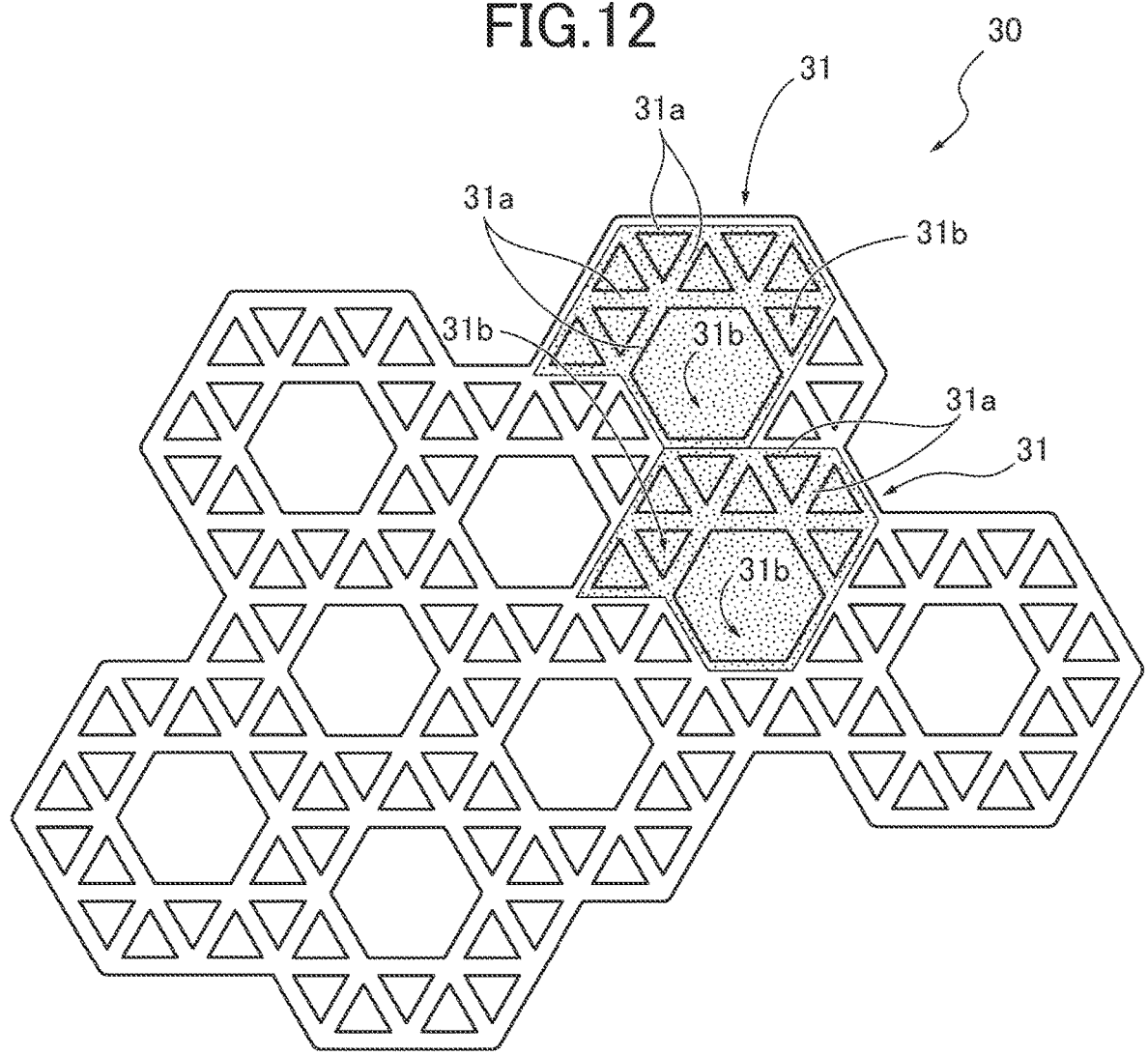

DENTAL INTRAORAL DEVICE AND MANUFACTURING METHOD THEREOF

CROSS-REFERENCE TO RELATED APPLICATION

The present disclosure is based on and claims priority to Japanese Patent Application No. 2019-208221, filed on Nov. 18, 2019, the disclosure of which is hereby incorporated by reference in its entirety.

TECHNICAL FIELD

The present disclosure relates to a dental intraoral device to be worn within an oral cavity, and a method for manufacturing the dental intraoral device.

BACKGROUND ART

A mouthpiece-type intraoral device such as an orthodontic aligner and an oral appliance (OA) for the treatment of sleep apnea syndrome is formed by pressing a resin sheet into a dental model. Also, an intraoral device such as a denture base is usually formed by mixing a polymer powder such as PMMA with a monomer solution such as MMA and then heat-curing the mixture. Intraoral devices provided with a base or bed portion are known to improve the strength and fracture resistance of the intraoral devices (see Patent Literatures 1 and 2).

Patent Literature 1 (JP 2019-130286 A) discloses a denture including a denture base and artificial teeth arranged on the denture base. Patent Literature 2 (WO 2000/001317A1) discloses a mandibular advancement device for the treatment of snoring and/or obstructive sleep apnea. The mandibular advancement device includes a base with a shape covering a gingiva or gum.

SUMMARY

However, the denture base disclosed in Patent Literature 1 as well as the mandibular advancement device for the treatment of snoring and/or obstructive sleep apnea disclosed in Patent Literature 2 are molded into a solid shape and as a result, the base portion becomes relatively thick to ensure sufficient strength and fracture resistance.

Accordingly, an object of the present disclosure is to provide a dental intraoral device that can reduce the thickness of a base portion while having sufficient strength and fracture resistance.

To achieve the above object, a dental intraoral device according to the present disclosure is a dental intraoral device that is worn within an oral cavity including a resin base portion that follows a shape of the oral cavity. At least a part of the base portion is formed into a mesh shape.

BRIEF DESCRIPTION OF DRAWINGS

FIG. 1 is an exploded perspective view illustrating an orthodontic aligner according to a first embodiment and an upper jaw. FIG. 12 is a plan view illustrating unit regions of a base portion according to another example.

DETAILED DESCRIPTION

Figure 2:
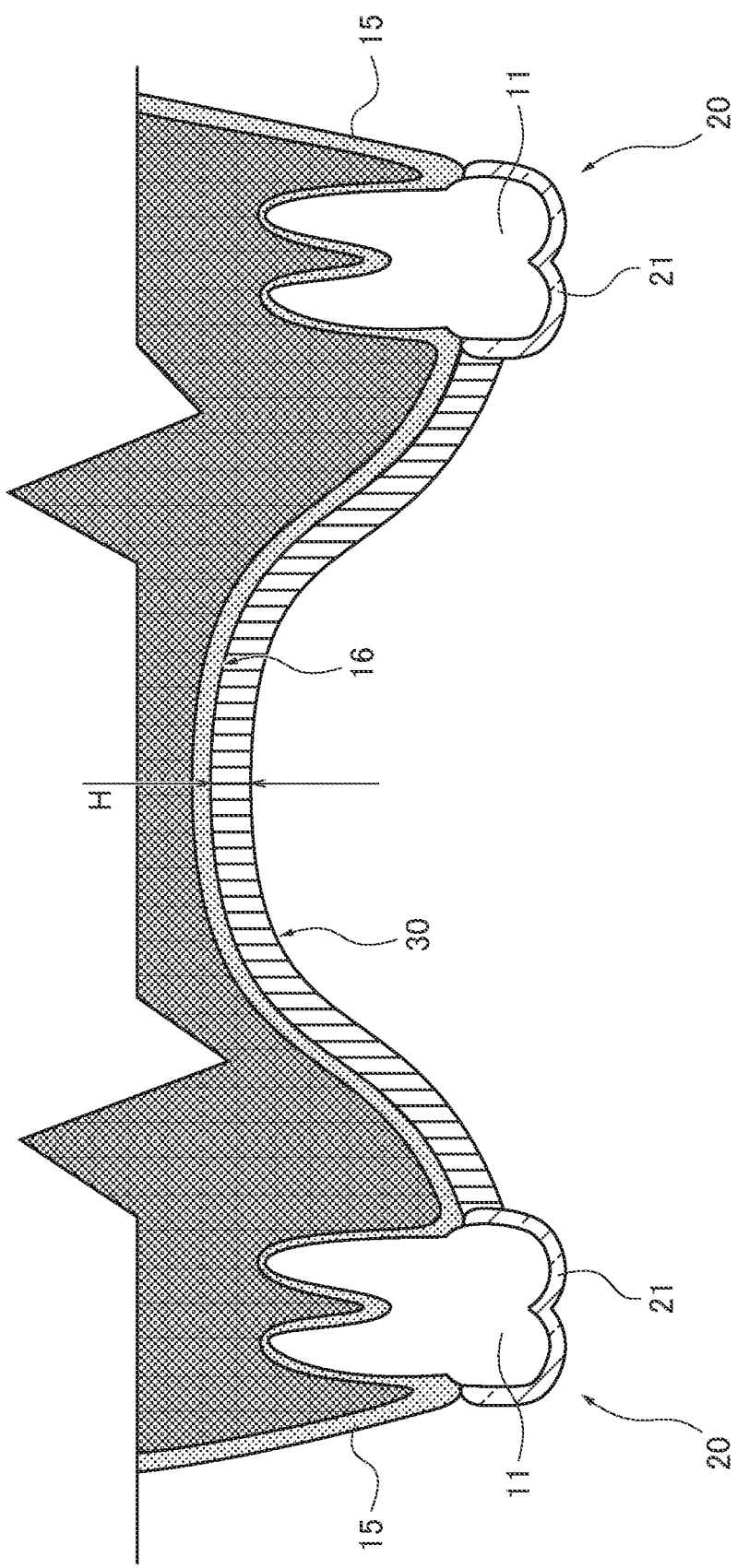
FIG. 2 is a cross-sectional view illustrating a state where the orthodontic aligner according to the first embodiment is worn within an oral cavity.

Hereinafter, embodiments of a dental intraoral device according to the present disclosure are described with reference to first to third embodiments illustrated in the drawings.

First Embodiment

A dental intraoral device in the first embodiment is applied to an orthodontic aligner to be worn within an oral cavity to cover upper teeth.

Figure 3:
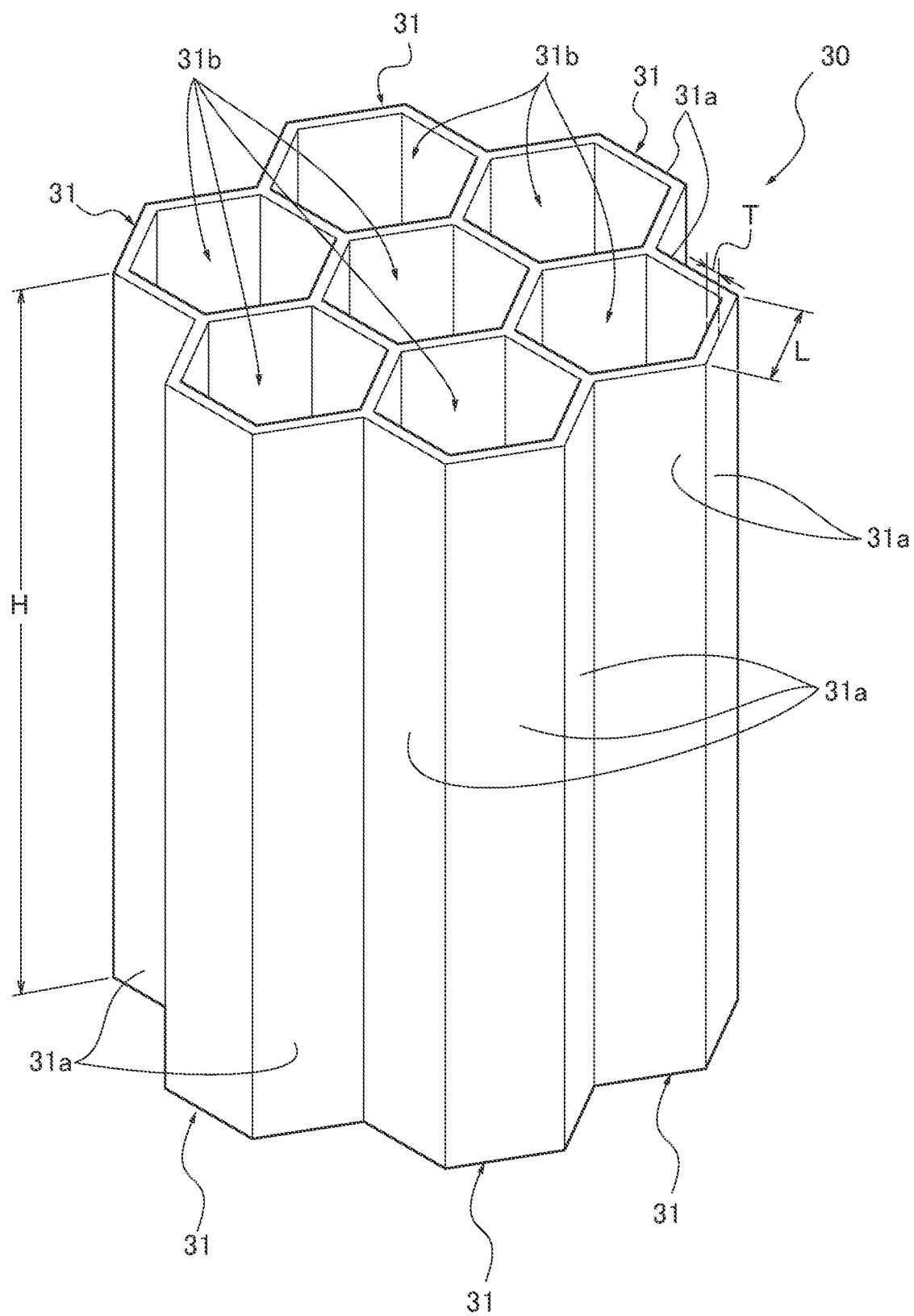
FIG. 3 is a perspective view illustrating unit regions of a base portion.
Figure 4:
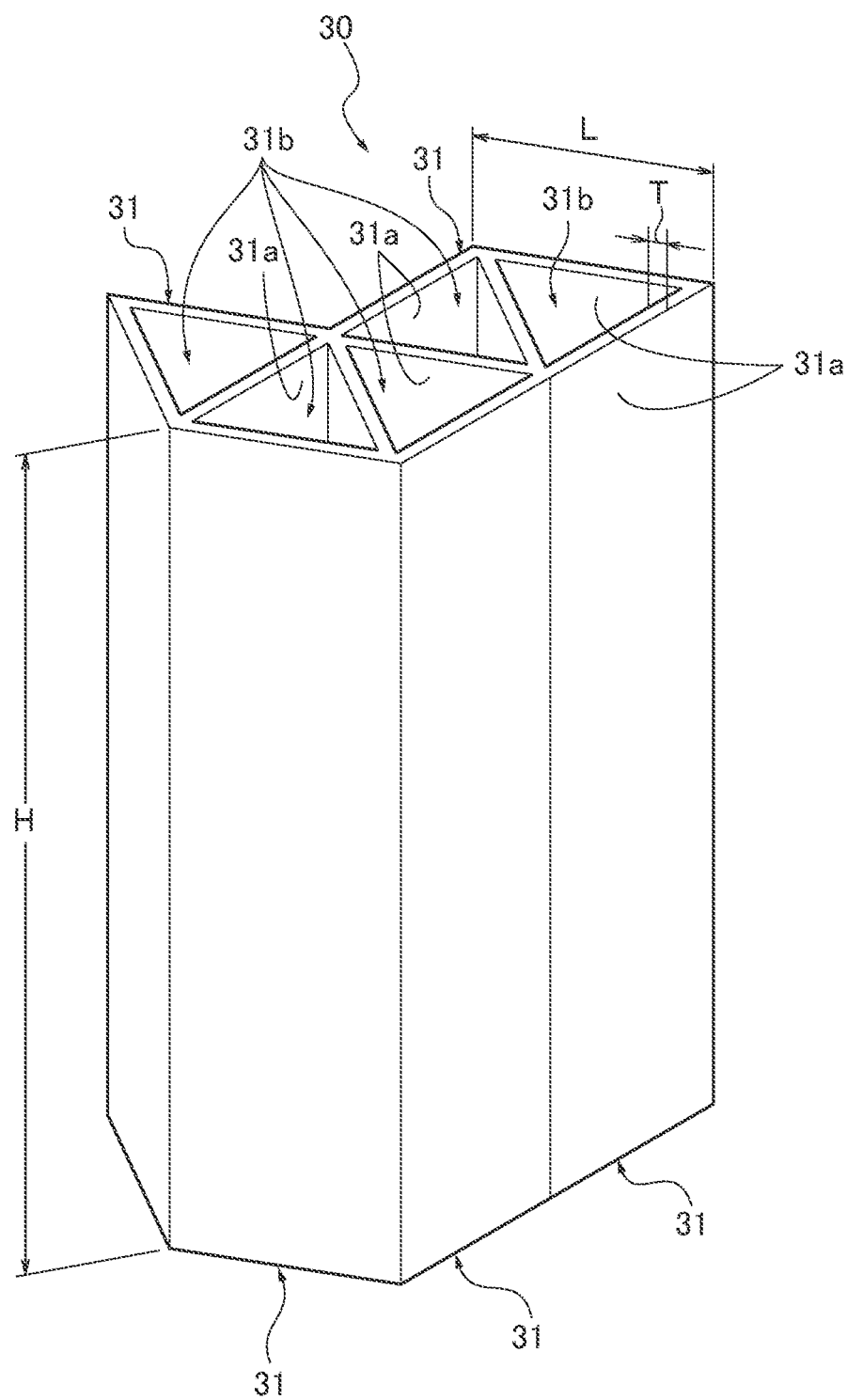
FIG. 4 is a perspective view illustrating unit regions according to a modified example of the first embodiment.
Figure 5:
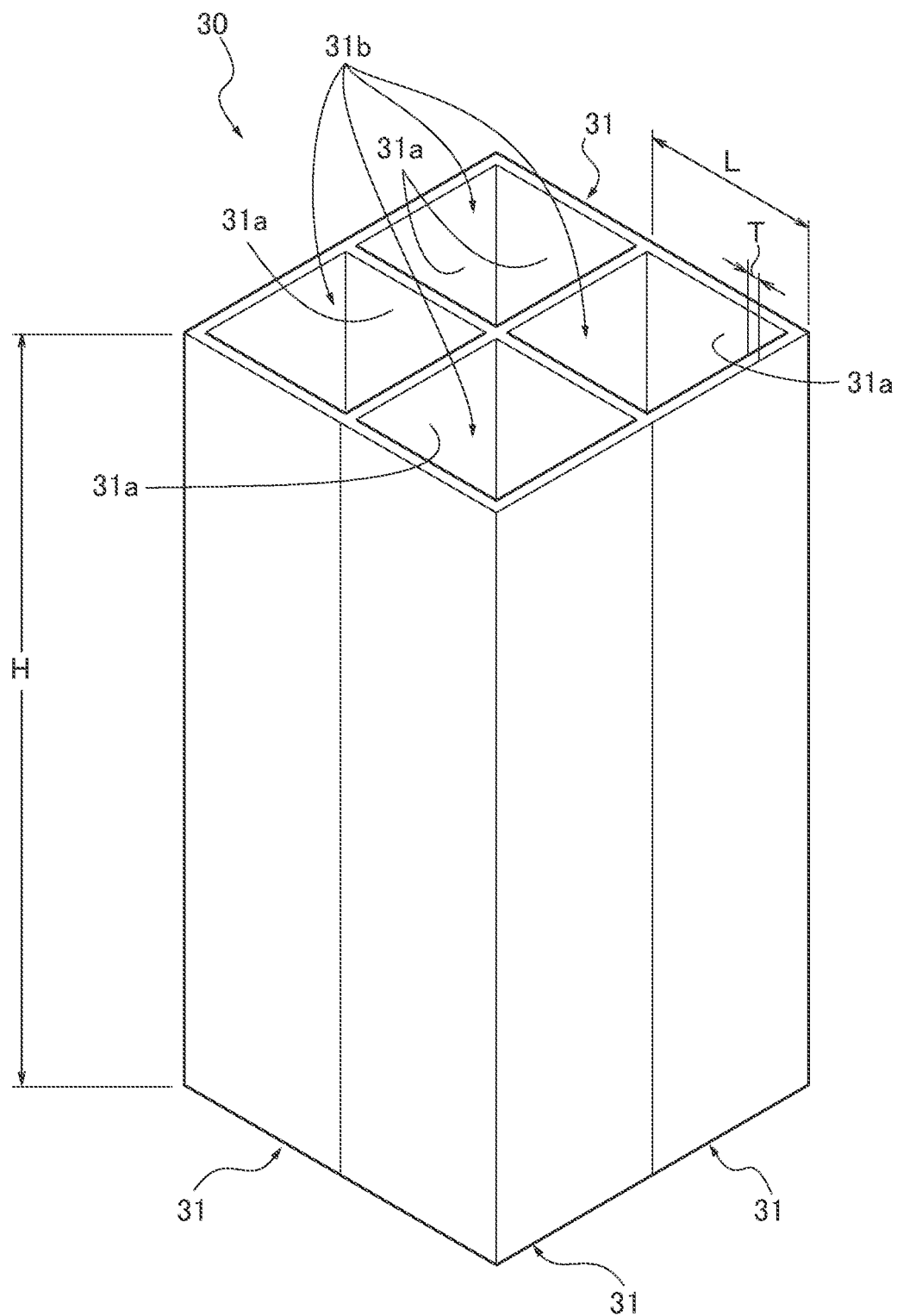
FIG. 5 is a perspective view illustrating unit regions according to another modified example of the first embodiment.

(Configuration of Orthodontic Aligner) FIG. 1 is an exploded perspective view illustrating an orthodontic aligner according to the first embodiment and an upper jaw. FIG. 2 is a cross-sectional view illustrating a state where the orthodontic aligner according to the first embodiment is worn within an oral cavity. FIG. 3 is a perspective view illustrating unit regions of a base portion. FIG. 4 is a perspective view illustrating unit regions according to a modified example of the first embodiment. FIG. 5 is a perspective view illustrating unit regions according to another modified example of the first embodiment.

The configuration of the orthodontic aligner according to the first embodiment is described below.

An orthodontic aligner 20 is formed by a three-dimensional modeling device based on the three-dimensional data. The orthodontic aligner 20 is worn over teeth 10 before straightening, and the teeth 10 to be straightened are straightened to a desired straightening position.

As illustrated in the upper drawing in FIG. 1, the teeth 10 are supported by gum or gingiva 15 embracing the roots of the teeth 10. A part that protrudes from the gingiva 15 is a tooth crown 11.

As illustrated in the lower drawing in FIG. 1 and FIG. 2, the orthodontic aligner 20 includes crown portions 21 that are formed in a recessed groove shape to cover tooth crowns 11, and a bed or base portion 30 that connects palatal-side edges of the crown portions 21. The base portion 30 is formed to follow the shape of the upper jaw 16 and has a predetermined thickness H. The thickness H may be in a ranger from 0.05 [mm] or more to 0.8 [mm] or less. Preferably, the thickness H may be 0.7 [mm] or less.

As illustrated in FIGS. 1 and 3, the base portion 30 is formed into a mesh shape by approximately regularly arranging the unit regions 31 including holes 31b. The mesh shape means a regular or at least partially random three-dimensional mesh structure. Note that FIG. 1 partially illustrates the unit regions 31 in an enlarged view. The base portion 30 is entirely formed into the mesh shape in the first embodiment. However, a part of the base portion 30 may be formed into the mesh shape. FIGS. 3 to 5 illustrate examples of the unit regions 31.

(Regular Hexagon Unit Region) As illustrated in FIG. 3, the cross-sectional shape of each of the unit regions 31 is formed by a regular hexagon in the present embodiment. The regular hexagon is a regular polygon that can tessellate (realize a tessellation) with one type of the polygon (polygonal shape). Each of the unit regions 31 is formed in a tubular or cylindrical shape by side walls 31a, which define the regular hexagon in a plan view, and includes the hole 31b that extends in a vertical direction. The hole 31b allows saliva, heat, and the like to be transmitted to the upper jaw 16.

A length L of each side of the unit region 31 is preferably, for example, 0.1 [mm] or more in terms of the passability of saliva, and is preferably, for example, 5.0 [mm] or less in terms of the securing of its strength. A thickness T of the side wall 31a may be set to a predetermined value (e.g., 0.02 [mm]). A ratio L/T of the thickness T to the length L is preferably 1.25 to 50, more preferably 1.5 to 40, and yet more preferably 2.0 to 30. The saliva easily passes when the ratio L/T of the thickness T to the length L is 1.25 or more. The side walls 31a that define the sides become difficult to buckle when the ratio L/T of the thickness T to the length L is 50 or less.

(Regular Triangle Unit Region) As illustrated in FIG. 4, the cross-sectional shape of each of the unit regions 31 in another example may be formed by a regular triangle. The regular triangle is a regular polygon that can tessellate (realize the tessellation) with one type of the polygon (polygonal shape). Each of the unit regions 31 is formed in the tubular or cylindrical shape by the side walls 31a, which define the regular triangle in a plan view, and includes the hole 31b that extends in the vertical direction. The hole 31b allows saliva, heat, and the like to be transmitted to the upper jaw 16.

The length L of each side of the unit region 31 is preferably, for example, 0.1 [mm] or more in terms of the passability of saliva, and preferably 5.0 [mm] or less in terms of the securing of its strength. The thickness T of the side wall 31a may be set to a predetermined value (e.g., 0.02 [mm]). The ratio L/T of the thickness T to the length L is preferably 2.5 to 100, more preferably 3.0 to 90, and yet more preferably 3.5 to 80. The saliva easily passes when the ratio L/T of the thickness T to the length L is 2.5 or more. The side walls 31a that define the sides becomes difficult to buckle when the ratio L/T of the thickness T to the length L is 100 or less.

(Regular Tetragon Unit Region) As illustrated in FIG. 5, the cross-sectional shape of each of the unit regions 31 in another different example may be formed by a regular tetragon. The regular tetragon is a regular polygon that can tessellate (realize a tessellation) with one type of the polygon. Each of the unit regions 31 is formed in the tubular or cylindrical shape by the side walls 31a, which define the regular tetragon in a plan view, and includes the hole 31b that extends in the vertical direction. The hole 31b allows saliva, heat, and the like to be transmitted to the upper jaw 16.

The length L of each side of the unit region 31 is preferably, for example, 0.1 [mm] or more in terms of the passability of saliva, and preferably 5.0 [mm] or less in terms of the securing of strength. The thickness T of the side wall 31a may be set to a predetermined value (e.g., 0.02 [mm]). The ratio L/T of the thickness T to the length L is preferably 2.0 to 80, more preferably 2.5 to 70, and yet more preferably 3.0 to 60. The saliva easily passes when the ratio L/T of the thickness T to the length L is 2.0 or more. The side walls 31a that define the sides become difficult to buckle when the ratio L/T of the thickness T to the length L is 80 or less.

The orthodontic aligner 20 is additively manufactured by applying ultraviolet laser light to a photo-curing resin by using the three-dimensional modeling device based on three-dimensional data of the orthodontic aligner 20 previously generated by three-dimensional software. For example, a resin containing a radical polymerizable compound such as a meth(acrylic) monomer, a polymerizable monomer including a cationic polymerization compound such as an epoxy compound, and a photopolymerization initiator may be used as the photo-curing resin.

As illustrated in FIG. 2, the orthodontic aligner 20 as configured above is worn to cover the tooth crown 11 in the upper jaw 16. The teeth 10 wearing the orthodontic aligner 20 are straightened to a desired straightening position.

A plurality of the orthodontic aligners 20 is prepared to straighten the teeth 10 to the final desired straightening position step by step.

Note that the cross-sectional shape of the unit region 31 is not limited to a regular hexagon, a regular triangle, or a regular tetragon, and may be a regular polygon that can tessellate (realize the tessellation) with one type of the polygon (polygonal shape). Also, the cross-sectional shape of the unit region 31 may be a regular polygon that can realize the tessellation by following the shape of the upper jaw 16.

(Effect of Dental Intraoral Device) The effect of the dental intraoral device (orthodontic aligner 20) according to the first embodiment is described below. The dental intraoral device (orthodontic aligner 20) according to the first embodiment is a dental intraoral device that is worn within an oral cavity (upper jaw 16) including a resin base portion 30 that follows a shape of the oral cavity (upper jaw 16), wherein at least a part of the base portion 30 is formed into a mesh shape (FIG. 1).

Providing the base portion 30 makes it is possible to disperse the force applied to the dental intraoral device (orthodontic aligner) and prevent stress concentration. Further, by forming the base portion 30 in a mesh shape, the thickness of the base portion 30 can be reduced while ensuring a predetermined strength. Thereby, the dental intraoral device (orthodontic aligner 20) ensures a predetermined strength and allows the oral cavity to open relatively wider while wearing the dental intraoral device (orthodontic aligner 20). This makes it easier to pronounce and feel the temperature of food, which improves the QOL (Quality of Life) of the wearer.

In addition, the dental intraoral device (orthodontic aligner 20) can be relatively light. Thereby, the feeling of the foreign object for the patient can be reduced, and the falling off of the dental intraoral device (orthodontic aligner 20) due to its weight can be inhibited. Further, the dental intraoral device (orthodontic aligner 20) improves the passability of saliva and is therefore effective in inhibiting intraoral drying, preventing ulcers and tooth decay resulting from drying, and accelerating wound healing. Patients with weak resistance of mucous membranes relative to mechanical irritation due to diabetes or the like may suffer ulcers and pain due to damage to the tissue due to the dental intraoral device having the base portion. However, the dental intraoral device (orthodontic aligner 20) according to the present disclosure can reduce the contact area with the patient and accordingly, alleviate such symptoms.

In the dental intraoral device (orthodontic aligner 20) according to the first embodiment, at least a part of the base portion 30 is formed by approximately regularly arranging the unit regions 31 having the holes 31b (bottom figure in FIG. 1).

Thereby, the force applied to the base portion 30 can be isotropically dispersed to prevent stress concentration. Therefore, it is possible to increase the amount of elastic deformation of the base portion 30 so as not to cause plastic deformation or fracture. As a result, the dental intraoral device (orthodontic aligner 20) can be easily attached to or detached from the oral cavity.

In the dental intraoral device (orthodontic aligner 20) according to the first embodiment, the cross-sectional shape of the unit region 31 is formed by the regular polygon that can tessellate (realize the tessellation) with one type of the polygon (FIGS. 3 to 5).

Thereby, the base portion 30 is provided with the unit regions 31 having uniform shapes without gaps among them. Therefore, the base portion 30 can be made thinner while ensuring a predetermined strength to make the base portion supple, hard to break, and relatively lighter.

In the dental intraoral device (orthodontic aligner 20) according to the first embodiment, the length of each side of the unit region 31 is 0.1 mm or more (FIGS. 3 to 5).

This can make it easier for a resin to flow out from the holes 31b of the unit regions 31, and avoid resin retention or the like when the dental intraoral device (orthodontic aligner 20) is manufactured by the three-dimensional modeling device.

Second Embodiment

A dental intraoral device according to a second embodiment differs from the dental intraoral device according to the first embodiment in that the configuration of a base portion is different from that of the base portion in the first embodiment.

Figure 6:
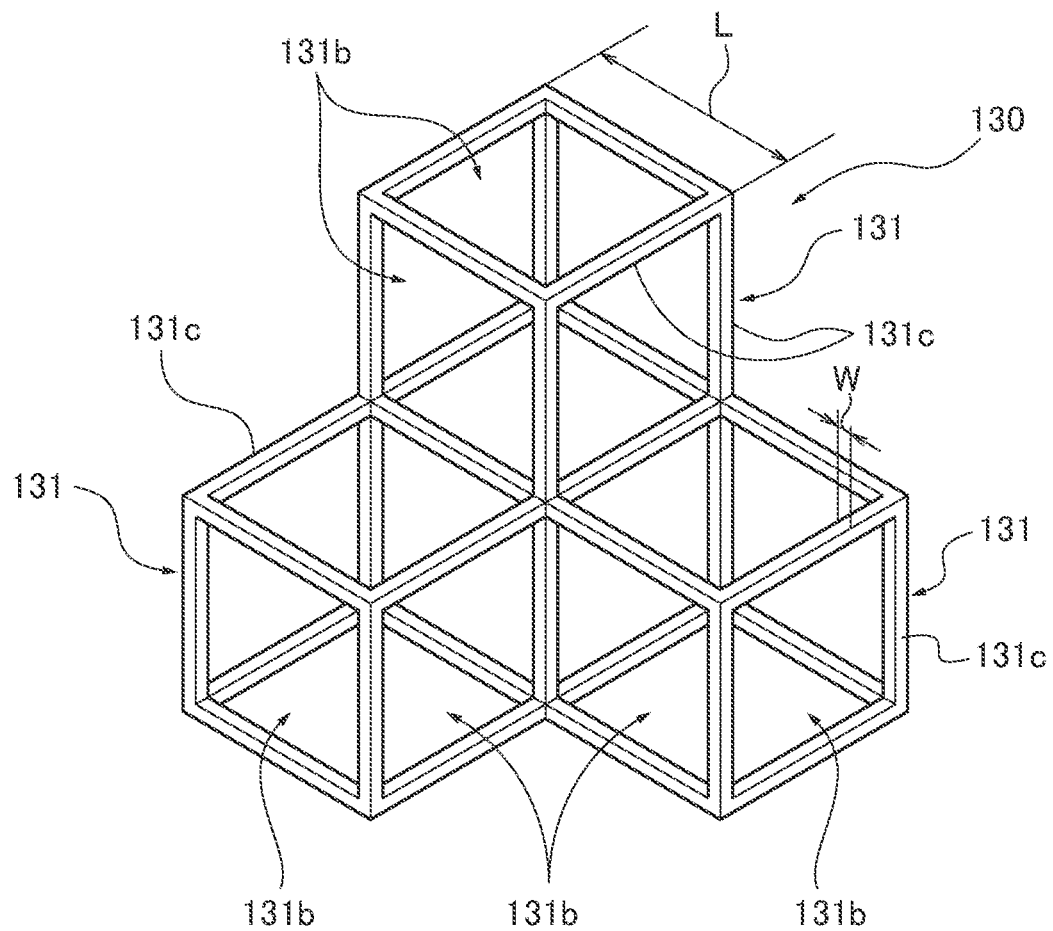
FIG. 6 is a perspective view illustrating unit regions of a base portion according to a second embodiment.

(Configuration of Dental Intraoral Device) FIG. 6 is a perspective view illustrating unit regions of a base portion according to the second embodiment. The configuration of the dental intraoral device according to the second embodiment is described below. Note that parts that are the same as or equivalent to those that have been described in the first embodiment are described by using the same terms and the same reference signs.

As illustrated in FIG. 6, a base portion 130 according to the second embodiment is formed into a mesh shape by approximately regularly arranging unit regions 131 having holes 131b.

Each of the unit regions 131 is formed by a regular hexahedron. The regular hexahedron is a polyhedron that can realize space-filling (fill a space) with one type of the polyhedron. In other words, the unit regions 131 are formed by the regular hexahedron that can fill a space having a predetermined thickness H along the shape of the upper jaw 16. Each of the unit regions 131 is formed into a frame shape by a frame 131c that connects the sides of the hexahedron and includes openings or holes 131b formed through the surfaces. The hole 31b allows saliva, heat, and the like to be transmitted to the upper jaw 16.

The unit regions 131 fill the space having the predetermined thickness H along the shape of the upper jaw 16 to form the base portion 130.

A length L of each side of the unit region 131 may be in a range from 0.1 [mm] or more to 5.0 [mm] or less, for example. A width W of the frame 131c may be set to a predetermined value (e.g., 0.02 [mm]). A ratio L/W of the width W to the length L is preferably 2.0 to 80, more preferably 2.5 to 70, and yet more preferably 3.0 to 60. The saliva easily passes when the ratio L/W of the width W to the length L is 2.0 or more. The frame 131c that defines the sides becomes difficult to buckle when the ratio L/W of the width W to the length L is 80 or less.

(Effect of Dental Intraoral Device) The effect of the dental intraoral device (orthodontic aligner 20) according to the second embodiment is described below. In the dental intraoral device (orthodontic aligner 20) according to the second embodiment, each of the unit regions 131 is formed by the polyhedron that can realize the space-filling (fill the space) with one type of the polyhedron (FIG. 6).

Thus, the base portion 130 can be provided with the unit regions 131 that have uniform shapes and are arranged without gaps. Thereby, the base portion 130 can be made thinner and lighter while ensuring a predetermined strength. As a result, wearing the orthodontic aligner 20 makes it easier to pronounce and feel the temperature of food, which improves the QOL (Quality of Life) of the wearer.

Note that other configurations and advantageous effects are approximately similar to those in the first embodiment described above, and the descriptions thereof are omitted.

Third Embodiment

A dental intraoral device according to a third embodiment differs from the dental intraoral device according to the first embodiment in that the configuration of a base portion is different from that of the base portion in the first embodiment.

Figure 7:
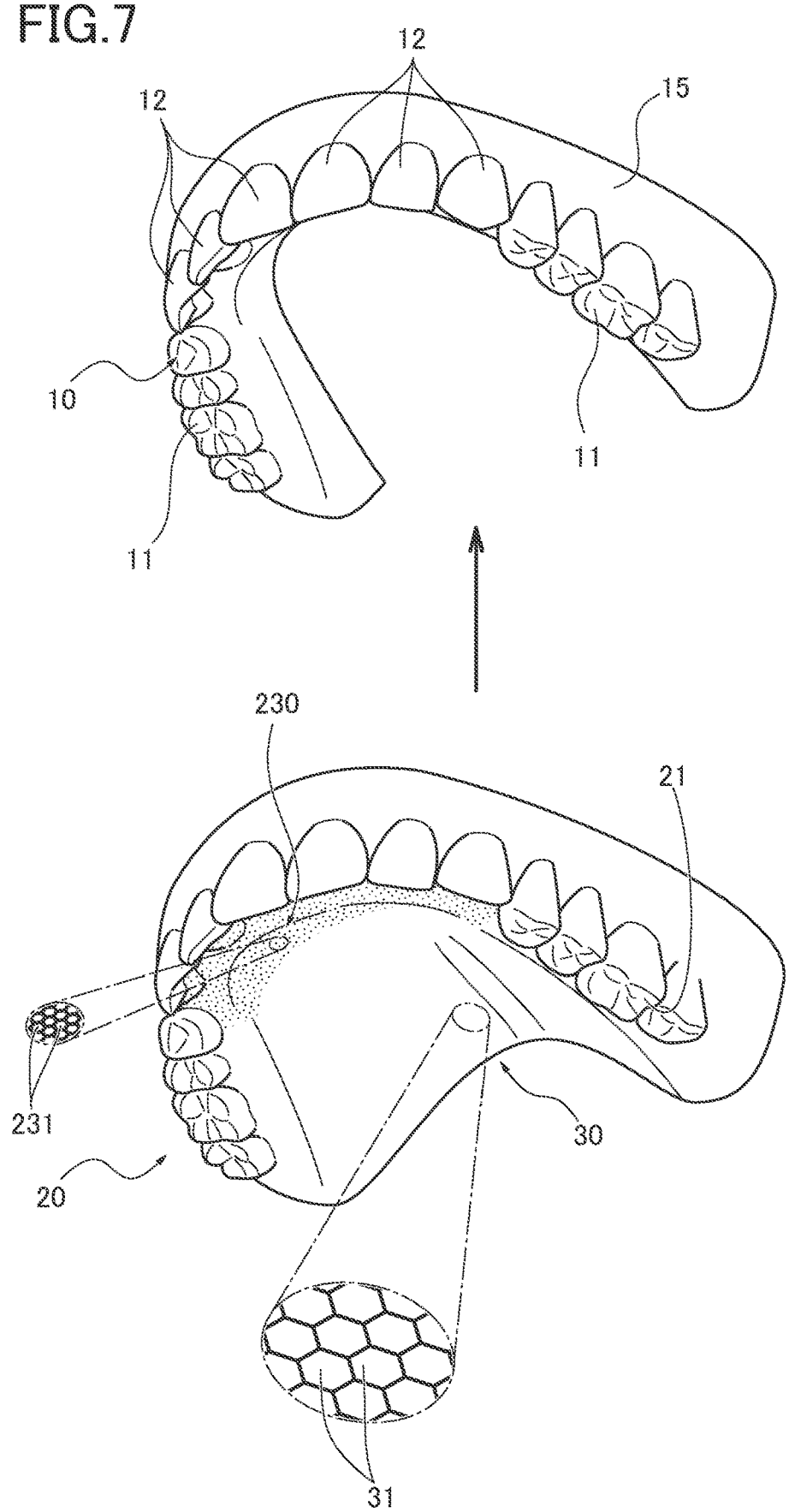
FIG. 7 is an exploded perspective view illustrating an orthodontic aligner according to a third embodiment and the upper jaw.

(Configuration of Dental Intraoral Device) FIG. 7 is an exploded perspective view illustrating an orthodontic aligner according to the third embodiment and an upper jaw. The configuration of the dental intraoral device according to the third embodiment is described below. Note that parts that are the same as or equivalent to ones that have been described in the first and second embodiments are described by using the same terms or the same reference signs.

As illustrated in FIG. 7, a front part 230 of the base portion 30 is formed by the unit regions 231 having higher rigidity than the unit regions 31 of the other parts of the base portion 30. The front part 230 is a front-side portion of the base portion 30 of the orthodontic aligner 20 attached to the upper jaw 16, that is a part of the base portion 30 close to the anterior teeth (front teeth) 12. In other words, the front part 230 is a part of the base portion 30 close to the crown portions 21 covering the anterior teeth 12. Note that FIG. 7 illustrates parts of the unit regions 31, 231 in an enlarged view.

For example, the unit regions 231 of the front part 230 may be formed with smaller shapes than the unit regions 31 of the other parts to have higher rigidity than the unit regions 31. More specifically, the length of each side of each unit region 231 of the front part 230 may be set to 0.1 [mm] while the length of each side of each unit region 31 of the other parts may be set to 0.5 [mm], for example.

Also, the thickness of each side wall of the unit region 231 of the front part 230 may be made thicker than that of each side wall of the unit region 31 of the other parts so that the rigidity of the unit region 231 becomes higher than that of the unit region 31.

(Effect of Dental Intraoral Device) The effect of the dental intraoral device (orthodontic aligner 20) according to the third embodiment is described below. In the orthodontic aligner 20 according to the third embodiment, the front part 230 of the base portion 30 is formed by the unit regions 231 having higher rigidity than the unit regions 31 of the other parts of the base portion 30 (FIG. 7).

By forming the unit regions 231 in the front part 230 of the base portion 30 having higher rigidity than the unit regions 31 of the other parts of the base portion 30, for example, it is possible to increase the strength of the front part 230 to which larger stress is applied when attaching and detaching the dental intraoral device (orthodontic aligner 20).

For example, by forming the unit regions 231 of the front part 230 of the base portion 30 having a denser configuration than the unit regions 31 of the other parts of the base portion 30, it is possible to increase the strength of the front part 230 to which the larger stress is applied when attaching and detaching the dental intraoral device (orthodontic aligner 20). As a result, wearing the orthodontic aligner 20 according to the third embodiment makes it easier to pronounce and feel the temperature of food, which improves the QOL (Quality of Life) of the wearer.

Note that other configurations and advantageous effects are approximately similar to those in the first and second embodiments described above, and accordingly, the description thereof is omitted.

The dental intraoral device according to the present disclosure has been described above in accordance with the first to third embodiments. However, the specific configurations are not limited to the ones described in these embodiments, and design changes, additions, combinations of the embodiments, and the like are allowed without departing from the spirit of the invention according to each claim.

In the first to third embodiments, as an example of the three-dimensional modeling device, the stereolithography apparatus using the photo-curing resin that is cured by ultraviolet laser light has been shown. However, the three-dimensional modeling device may be a projection type that cures and laminates a photo-curing resin by utilizing the light of a projector, may be an inkjet type that cures and laminates a liquid photo-curing resin by jetting the resin and applying ultraviolet light thereto, may be a fused deposition modeling type that piles up a thermoplastic resin layer by layer, or may be a powder sintering type that applies high-output laser light to a powder material and sinters the material.

Figure 8:
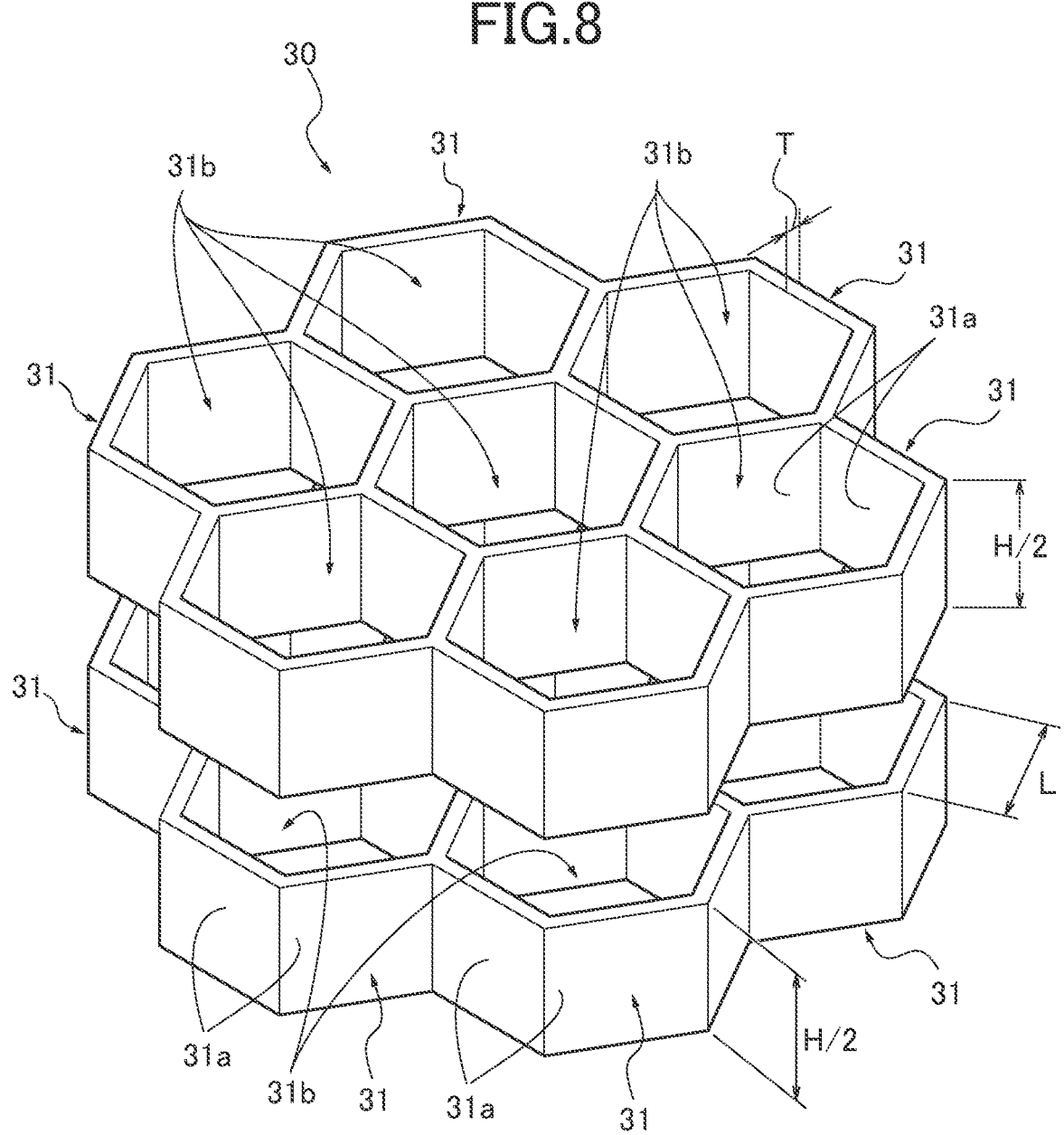
FIG. 8 is a perspective view illustrating unit regions of a base portion according to another example.

In the first and third embodiments, the base portion 30 is formed by one layer or stage of the unit regions. However, the base portion 30 may be formed by two layers or stages of the unit regions as illustrated in FIG. 8 or may be formed by three or more layers or stages of the unit regions.

In the first and third embodiments, the cross-sectional shape of the unit region 31 is the regular polygon that can tessellate (realize the tessellation) with one type of the polygon (polygonal shape). However, the cross-sectional shape of the unit region may be a polygon that can tessellate with one type of the polygon (polygonal shape).

Figure 9A:
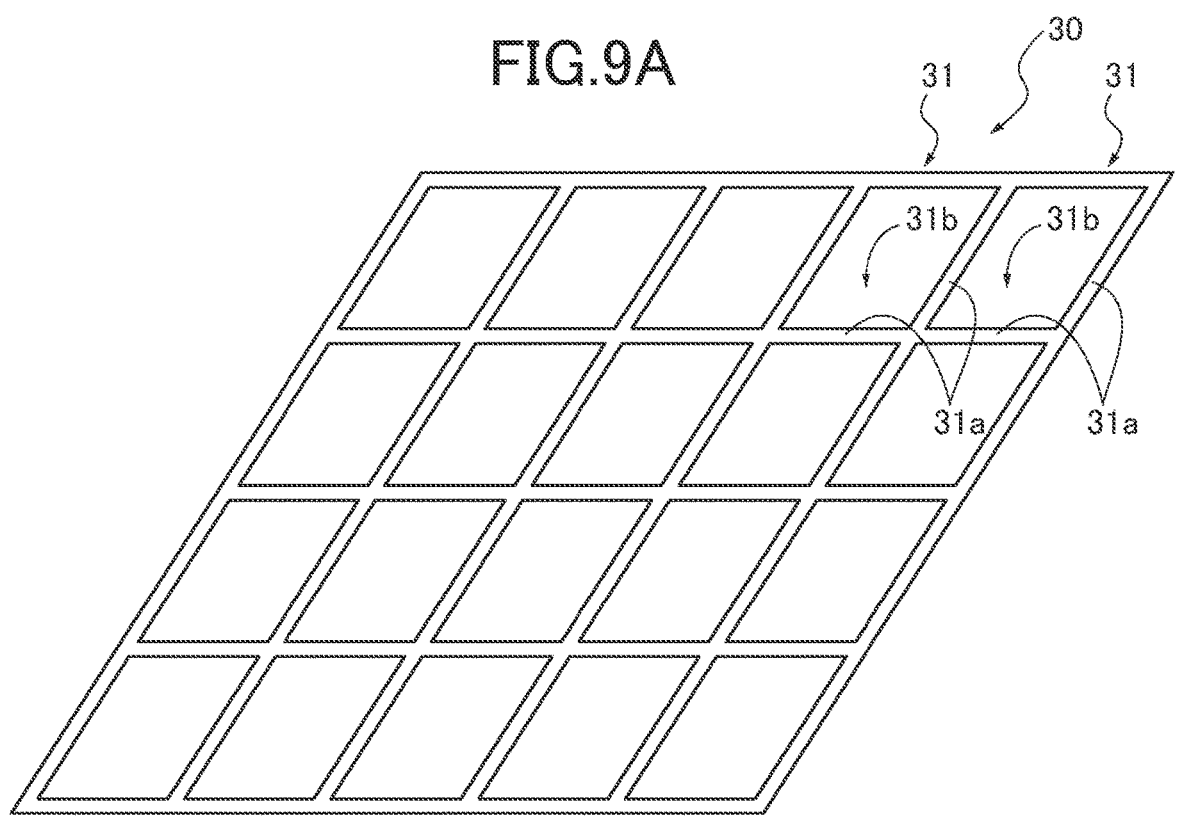
FIG. 9A is a plan view illustrating unit regions of a base portion according to another example.
Figure 9B:
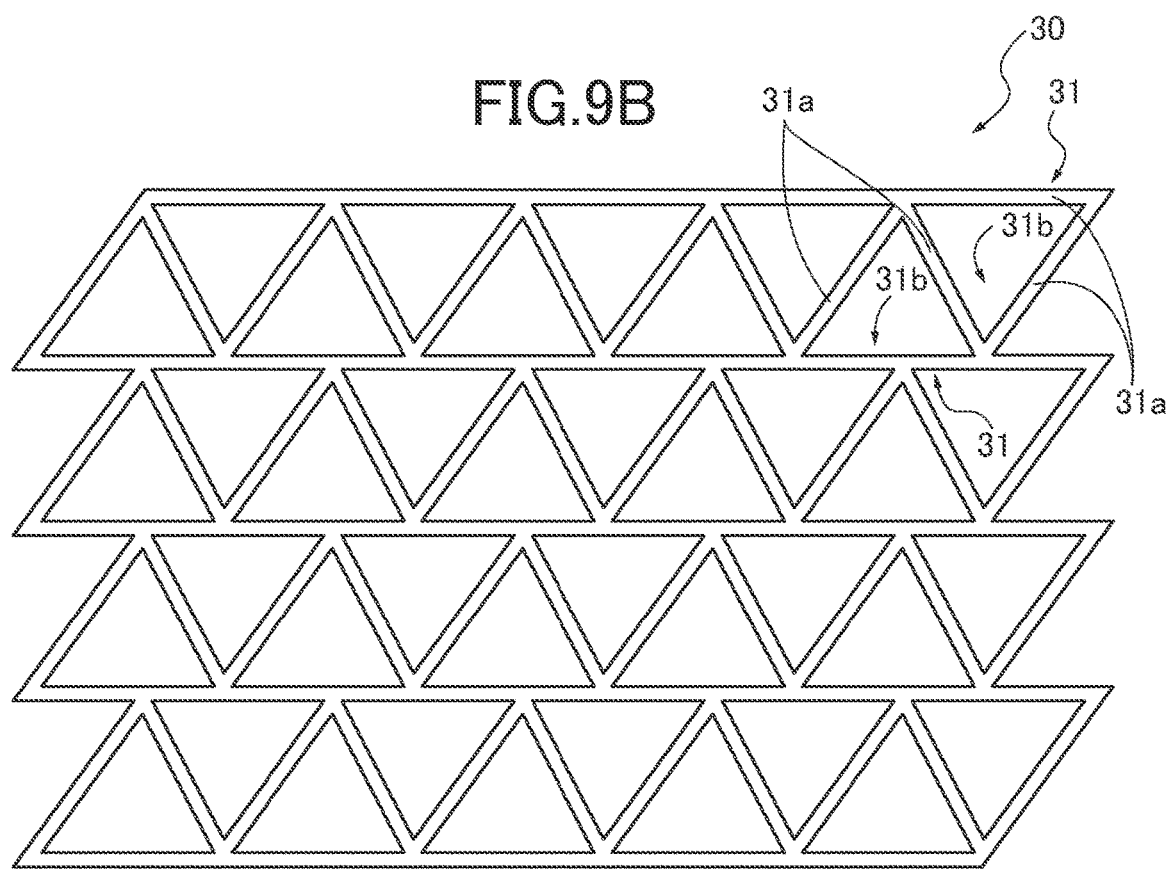
FIG. 9B is a plan view illustrating unit regions of a base portion according to another example.
Figure 10A:
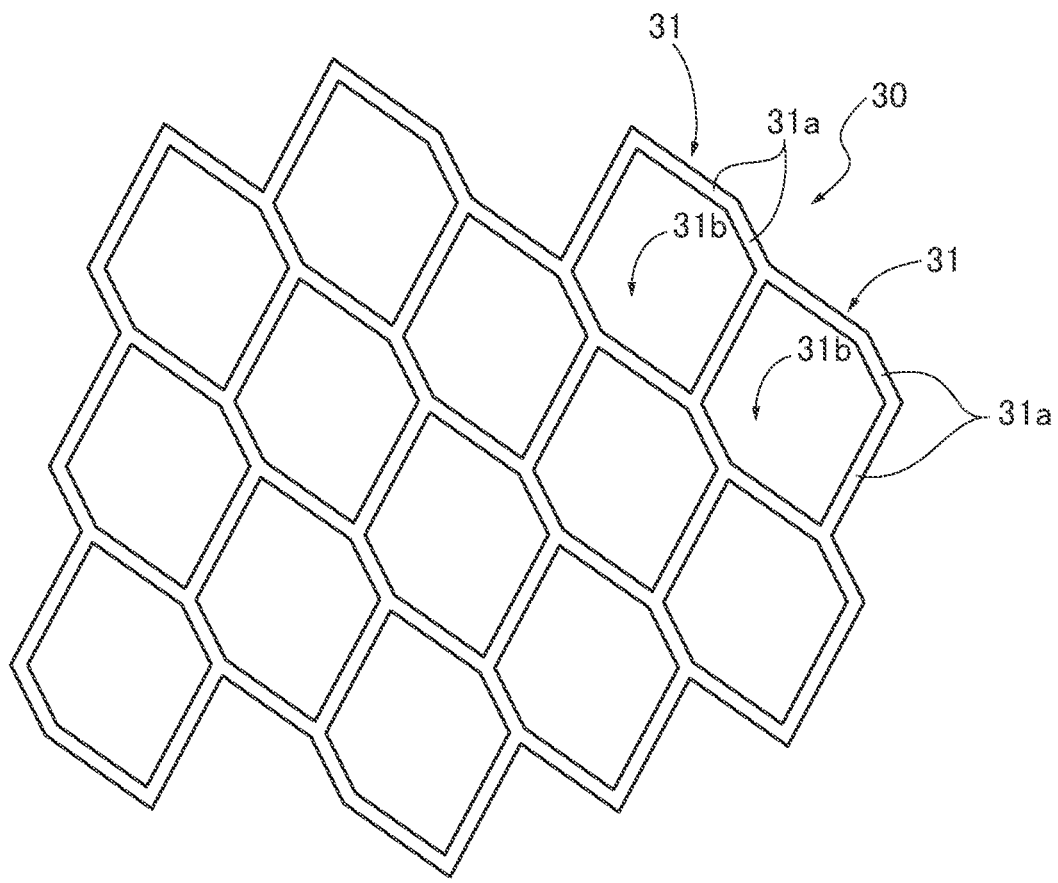
FIG. 10A is a plan view illustrating unit regions of a base portion according to another example.
Figure 10B:
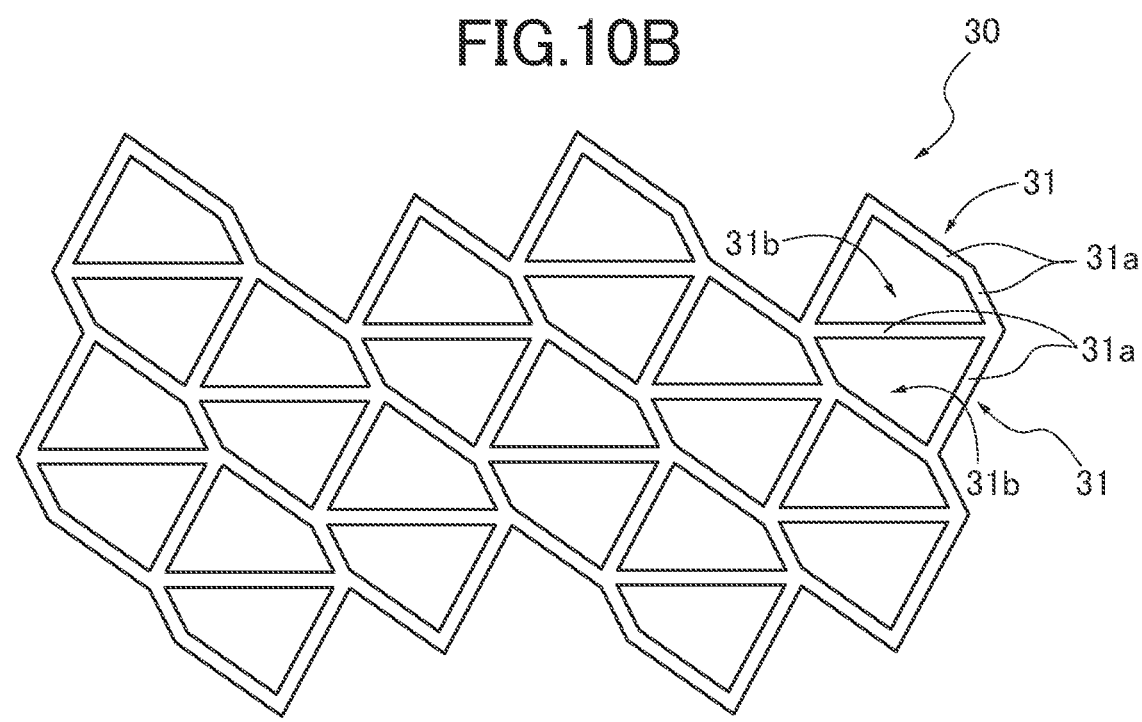
FIG. 10B is a plan view illustrating unit regions of a base portion according to another example.
Figure 11A:
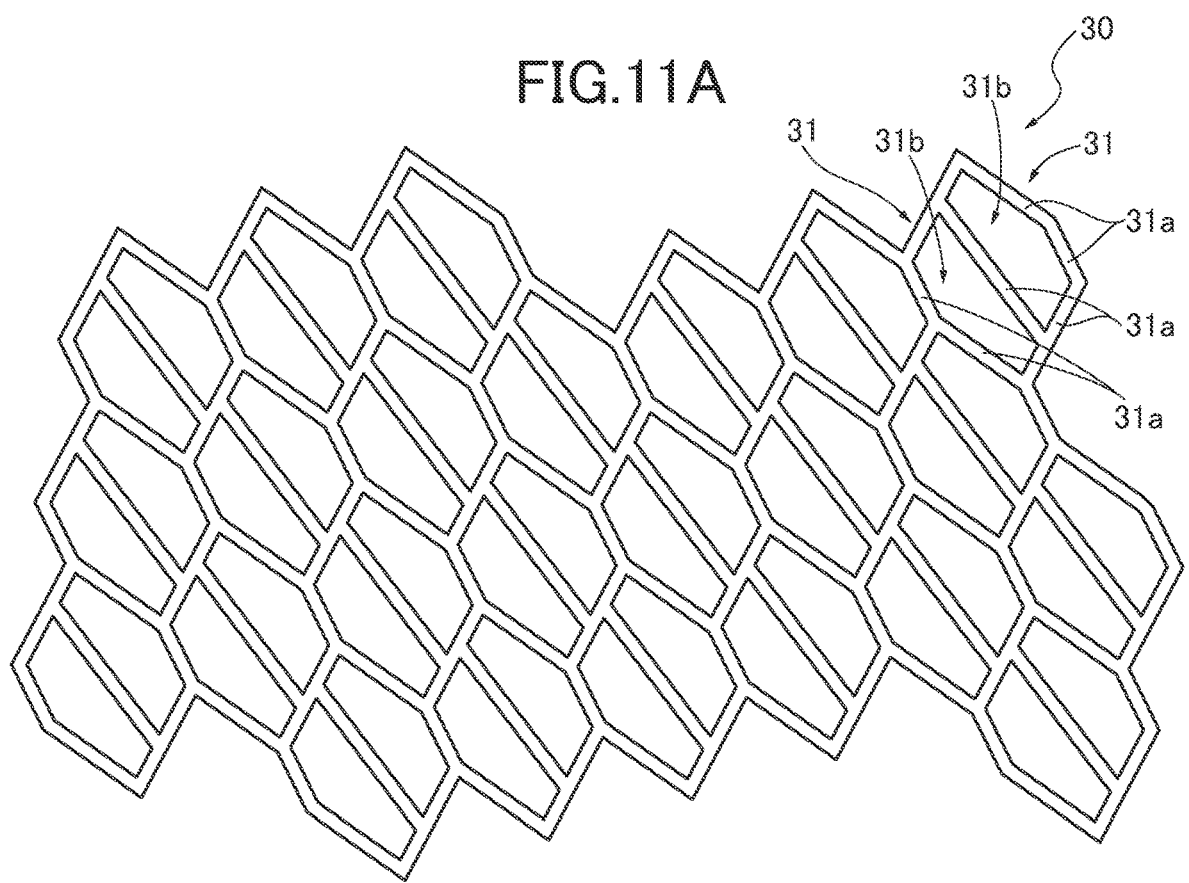
FIG. 11A is a plan view illustrating unit regions of a base portion according to another example.
Figure 11B:
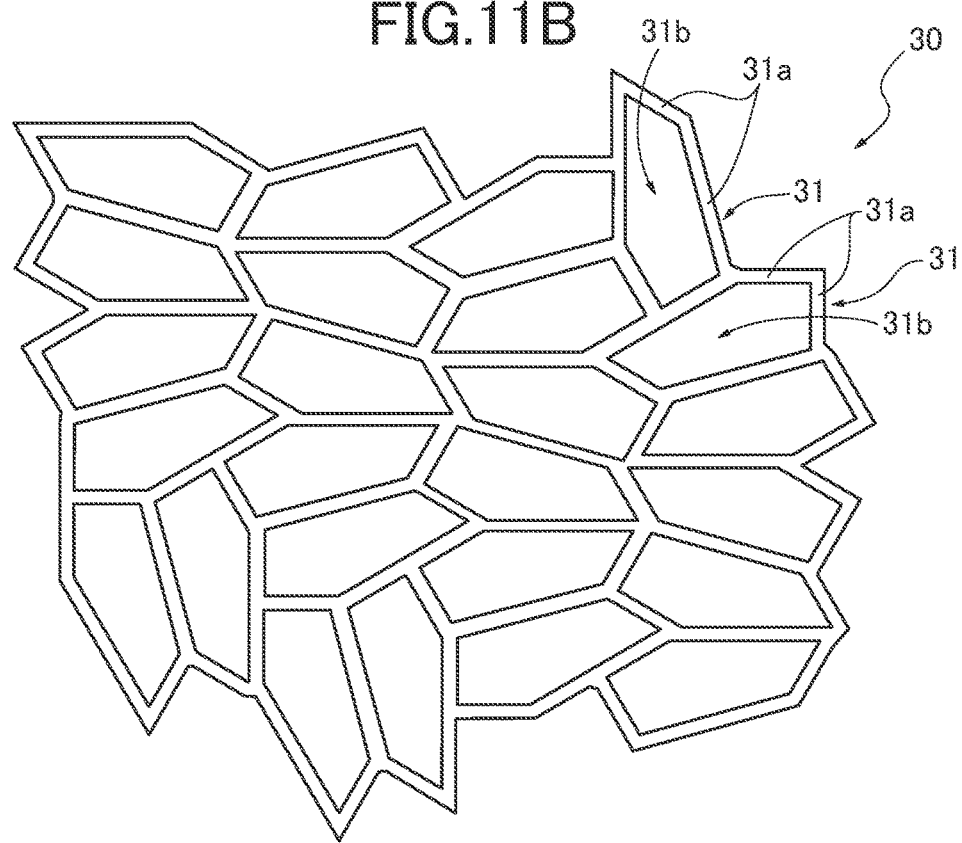
FIG. 11B is a plan view illustrating unit regions of a base portion according to another example.

For example, the polygon that can tessellate (realize the tessellation) with one type of the polygon may be a parallelogram as illustrated in FIG. 9A. Alternatively, the polygon that can tessellate with one type of the polygon may be a parallelogram that is formed by combining two congruent triangles as illustrated in FIG. 9B. Alternatively, the polygon that can tessellate with one type of the polygon may be a parallel hexagon as illustrated in FIG. 10A. Alternatively, the polygon that can tessellate with one type of the polygon may be a parallel hexagon formed by combining two congruent quadrangles as illustrated in FIG. 10B. Alternatively, the polygon that can tessellate with one type of the polygon may be a parallel hexagon formed by combining two congruent pentagons as illustrated in FIG. 11A. Alternatively, the polygon that can tessellate with one type of the polygon may be a pentagon that can tessellate as illustrated in FIG. 11B.

Moreover, a polygon that can tessellate (realize the tessellation) with two or more types of polygons may be a regular polygon that is an Archimedes' tessellation shape. For example, the polygon that can tessellate with two or more types of polygons may be a shape formed by eight regular triangles and one regular hexagon, as illustrated in FIG. 12.

A polygon that can tessellate (realize the tessellation) preferably a combination of one or more of a triangle, a quadrangle, a pentagon, a regular polygon, and a parallel hexagon. The polygon that can tessellate may be more preferably a combination of one or more of the regular polygon, the parallelogram, and the parallel hexagon. The polygon that can tessellate may be yet more preferably a combination of one or more of the regular triangle, the regular tetragon, and the regular hexagon. The improvement of the symmetry of the unit region makes it difficult for a given load to concentrate and makes it difficult for plastic deformation and breakage to be caused. Particularly, in the regular triangle, the regular tetragon, and the regular hexagon, a given load is isotropically distributed, and thus plastic deformation and breakage are significantly inhibited.

In other words, the cross-sectional shape of the unit region may be formed by a regular polygon that can tessellate (realize the tessellation), may be formed by a polygon that can tessellate, or may be formed by a figure that can tessellate.

In the second embodiment, the unit region 131 is the regular hexagon (Archimedes' regular quadratic prism) that can realize the space-filling (fill the space) with one type of the polyhedron. However, the unit region may be a uniform polyhedron that can realize the space-filling with one type of the polyhedron.

The uniform polyhedron that can realize the space-filling (fill the space) with one type of the polyhedron may be, for example, an Archimedes' regular triangular prism, Archimedes' regular hexagonal prism, a truncated octahedron, a rhombic dodecahedron, or the like.

The unit region may be a polyhedron that can realize the space-filling (fill the space) with one type of the polyhedron. The polyhedron that can realize the space-filling with one type of the polyhedron may be, for example, a gyrobifastigium (Johnson solid J26) or the like.

The unit region may be a uniform polyhedron that can realize the space-filling (fill the space) by two or more types of the polyhedron. The uniform polyhedron that can realize the space-filling by two or more types of the polyhedron may be, for example, a uniform polyhedron that consists of a regular tetrahedron and a regular octahedron, a uniform polyhedron that consists of a regular tetrahedron and a truncated tetrahedron, a uniform polyhedron that consists of a regular octahedron and a truncated hexahedron, a uniform polyhedron that consists of a regular octahedron and a cuboctahedron, or a uniform polyhedron that consists of a rhombitruncated cuboctahedron and a regular octagonal prism.

Alternatively, the uniform polyhedron that can realize the space-filling (fill the space) by two or more types of the polyhedron may be, for example, a uniform polyhedron that consists of a truncated tetrahedron, a truncated octahedron, and a cuboctahedron, a uniform polyhedron that consists of a truncated tetrahedron, a truncated hexahedron, and a rhombitruncated cuboctahedron, a uniform polyhedron that consists of a regular tetrahedron, a cube, and a rhombicuboctahedron, a uniform polyhedron that consists of a cube, a cuboctahedron, and a rhombicuboctahedron, or a uniform polyhedron that consists of a cube, a truncated octahedron, and a rhombitruncated cuboctahedron.

Alternatively, a uniform polyhedron that can realize the space-filling (fill the space) by two or more types of the polyhedron may be, for example, a combination of a cube, a truncated hexahedron, a rhombitruncated cuboctahedron, and a regular octagonal prism, or a combination of various types of equilateral rhombic polyhedrons.

The unit region may be a polyhedron that can realize the space-filling (fill the space) by two or more types of the polyhedron. The polyhedron that can realize the space-filling by two or more types of the polyhedron may be, for example, a polyhedron that consists of Johnson solid J1 (square pyramid) and Johnson solid J3 (triangular cupola), a polyhedron that consists of Johnson solid J1 (square pyramid) and Johnson solid J7 (elongated triangular pyramid), a polyhedron that consists of Johnson solid J1 and Johnson solid J27 (triangular orthobicupola), a polyhedron that consists of a regular tetrahedron and Johnson solid J1, a polyhedron that consists of a regular tetrahedron and Johnson solid J4 (square cupola), a polyhedron that consists of a regular tetrahedron and Johnson solid J8 (elongated square pyramid), a polyhedron that consists of a regular tetrahedron and Johnson solid J28 (square orthobicupola), a polyhedron that consists of a regular octahedron and Johnson solid J3, a polyhedron that consists of a regular octahedron and Johnson solid J7 (elongated triangular pyramid), a polyhedron that consists of a regular octahedron and Johnson solid J12 (triangular bipyramid), a polyhedron that consists of a truncated tetrahedron and Johnson solid J12, a polyhedron that consists of a truncated hexahedron and Johnson solid J1, or a polyhedron that consists of a cuboctahedron and Johnson solid J1.

Moreover, the polyhedron that can realize the space-filling (fill the space) by two or more types of the polyhedron may be, for example, a polyhedron that consists of a regular tetrahedron, Johnson solid J1, and Johnson solid J18 (elongated triangular cupola), a polyhedron that consists of a regular tetrahedron, Johnson solid J1, and Johnson solid J35 (elongated triangular orthobicupola), a polyhedron that consists of a regular tetrahedron, Johnson solid J1, and Johnson solid J36 (elongated triangular gyrobicupola), a polyhedron that consists of a regular tetrahedron, Johnson solid J1, and Johnson solid J15 (elongated square bipyramid), a polyhedron that consists of a regular tetrahedron, a regular hexahedron, and Johnson solid J28, a polyhedron that consists of a regular tetrahedron, a regular octahedron, and Johnson solid J15, a polyhedron that consists of a regular hexahedron, a regular dodecahedron, and Johnson solid J91 (bilunabirotunda), a polyhedron that consists of a regular hexahedron, a cuboctahedron, and Johnson solid J4, a polyhedron that consists of a regular hexahedron, a cuboctahedron, and Johnson solid J19 (elongated square cupola), a polyhedron that consists of a regular hexahedron, a cuboctahedron, and Johnson solid J28, a polyhedron that consists of a regular hexahedron, a regular tetrahedron, and Johnson solid J19, a polyhedron that consists of a regular octahedron, Johnson solid J1, and Johnson solid J3, or a polyhedron that consists of a regular octahedron, Johnson solid J1, and Johnson solid J7.

Moreover, the polyhedron that can realize the space-filling (fill the space) by two or more types of the polyhedron may be, for example, a polyhedron that consists of one or a combination of a regular tetrahedron, a regular hexahedron, and a cuboctahedron [Johnson solid J28 and Johnson solid J29 (square gyrobicupola)], a polyhedron that consists of one or a combination of a regular tetrahedron and Johnson solid J1 [a regular hexahedron, Johnson solid J8, and Johnson solid J15] and one or a combination of [Johnson solid J28 and Johnson solid J29], a polyhedron that consists of a regular tetrahedron, a regular hexahedron, a cuboctahedron, and Johnson solid J37 (elongated square gyrobicupola), a polyhedron that consists of a regular tetrahedron, a regular hexahedron, Johnson solid J1, and Johnson solid J8, a polyhedron that consists of a regular tetrahedron, a regular octahedron, Johnson solid J1, and Johnson solid J15, a polyhedron that consists of a regular tetrahedron, Johnson solid J8, Johnson solid J15, and Johnson solid J19, a polyhedron that consists of one or a combination of a regular tetrahedron, Johnson solid J1, and Johnson solid J28 [a regular hexahedron, Johnson solid J8, and Johnson solid J15], a polyhedron that consists of one or a combination of a regular tetrahedron, Johnson solid J1, and Johnson solid J37 [a regular hexahedron, Johnson solid J8, and Johnson solid J15], a polyhedron that consists of one or a combination of a regular tetrahedron, a regular hexahedron, Johnson solid J1, and Johnson solid J19 [Johnson solid J8 and Johnson solid J15], or a polyhedron that consists of one or a combination of a regular tetrahedron, Johnson solid J1, and Johnson solid J4 [a regular hexahedron, Johnson solid J8 and Johnson solid J15].

The polyhedron that can realize the space-filling (fill the space) may be preferably a combination of one or more of a regular polyhedron, a semi-regular polyhedron, a regular prism, a regular antiprism, and a Johnson solid. The polyhedron that can realize the space-filling may be more preferably a combination of one or more of equilateral rhombic polyhedrons such as a regular polyhedron, a cuboctahedron, a regular polygonal prism, and a rhombic dodecahedron, a parallelepiped, a truncated octahedron, a parallelohedron such as an elongated rhombic dodecahedron, a rhombicuboctahedron, and a rhombitruncated cuboctahedron. The polyhedron that can realize the space-filling may be yet more preferably a combination of one or more of a regular tetrahedron, a regular hexahedron (cube), a regular octahedron, a regular triangular prism, a regular quadrangular prism (cuboid), a regular hexagonal prism, a truncated octahedron, a rhombic dodecahedron, and an elongated rhombic dodecahedron.

The improvement of the symmetry of the unit region makes it difficult for a given load to concentrate and makes it difficult for plastic deformation and breakage to be caused. Particularly, in the regular tetrahedron, a regular hexahedron (cube), a regular octahedron, a regular triangular prism, a regular quadrangular prism (cuboid), a regular hexagonal prism, a truncated octahedron, a rhombic dodecahedron, and an elongated rhombic dodecahedron, a given load is isotropically distributed, and thus plastic deformation and breakage are significantly inhibited.

In other words, the unit region may be formed by a uniform polyhedron that can realize the space-filling (fill the space), may be formed by a polyhedron that can realize the space-filling, or may be formed by a solid that can realize the space-filling.

In the first to third embodiments, the base portion 30 is entirely formed into the mesh shape by approximately regularly arranging the unit regions 31, 131 having the holes 31b, 131b. However, the base portion may be partially formed into the mesh shape by approximately regularly arranging the unit regions having the holes. The shape of the hole is not particularly limited but is preferably highly symmetrical. Specifically, the cross-sectional shape of the hole may be a circle, a regular triangle, a regular tetragon, a regular pentagon, a regular hexagon, or any other regular polygon. The cross-sectional shape of the hole is more preferably a circle, a regular triangle, a regular tetragon, or a regular hexagon. The cross-sectional shape of the hole is yet more preferably a circle since the circle has no notch that may be an origin of breaking is formed.

In the first to third embodiments, the sides that define each unit region are straight lines. However, the sides that define each unit region may be curved lines as long as the effects of the present disclosure are not maintained. For example, a curvature radius R is preferably equal to or more than 0.3 times the length L of the side of the unit region, more preferably equal to or more than 0.5 times, and yet more preferably equal to or more than 1.0 times. The upper limit of the curvature radius R is not particularly limited but may be, for example, equal to or less than 100 times the length L of the side of the unit region.

In the first to third embodiments, the side walls are solid. However, a part of the side wall may have a hole. Although not particularly limited, the shape of the hole is preferably highly symmetrical. Specifically, the cross-sectional shape of the hole may be a circle, a regular triangle, a regular tetragon, a regular pentagon, a regular hexagon, or any other regular polygon. The cross-sectional shape of the hole is more preferably a circle, a regular triangle, a regular tetragon, or a regular hexagon. The cross-sectional shape of the hole is yet more preferably a circle since the circle has no notch that may be an origin of breaking is formed.

Figure 13:
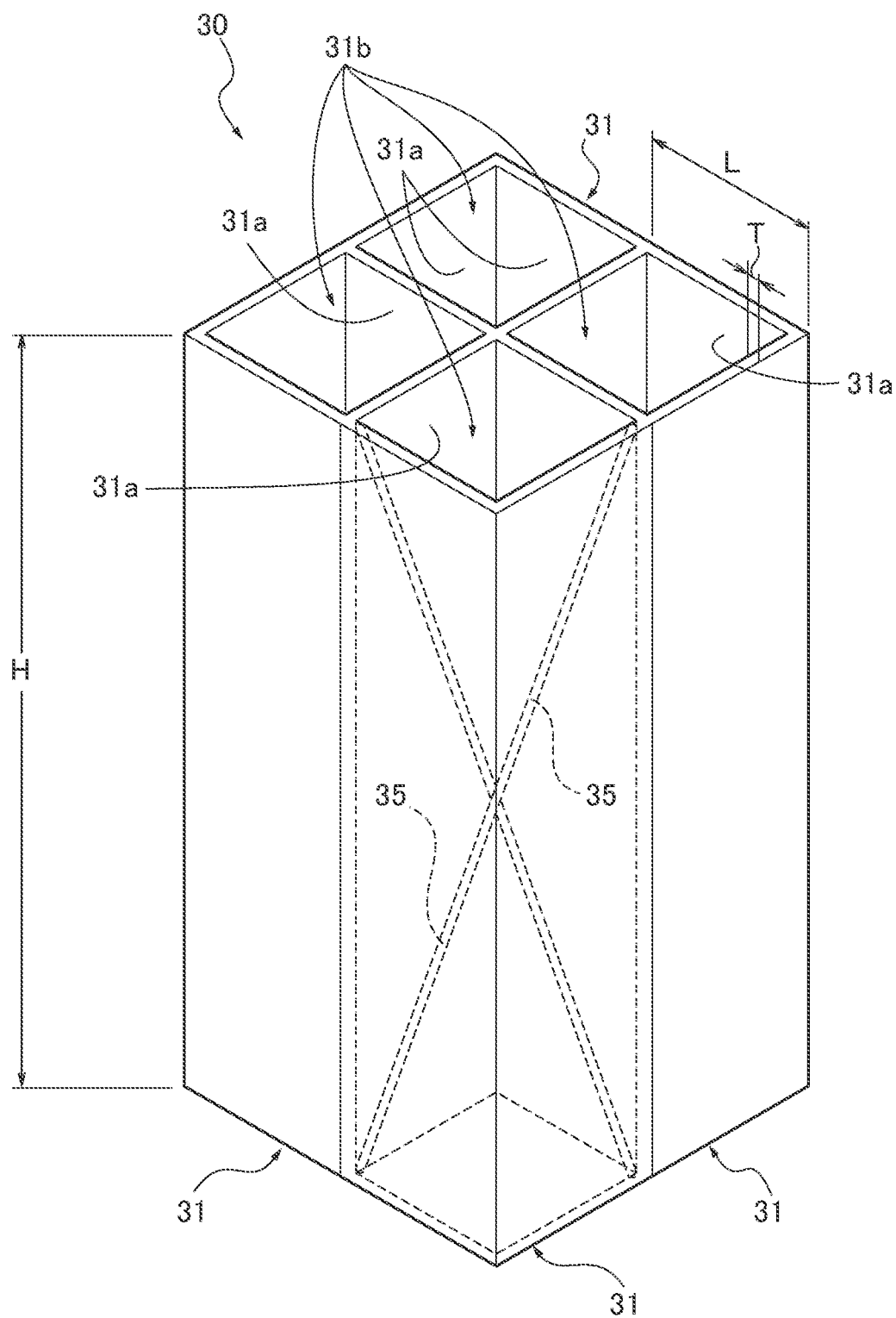
FIG. 13 is a perspective view illustrating unit regions of a base portion according to another example.

In the first to third embodiments, a reinforcing structure is not provided between side walls. However, as illustrated in FIG. 13, a reinforcing structure such as braces 35 may be provided between the side walls 31a.

In the first to third embodiments, the base portion 30 covers all of the gingiva, the hard palate, and the soft palate. However, the base portion may cover the gingiva and the hard palate or may cover only the gingiva. The base portion may cover any one or more of the gingiva, the hard palate, and the soft palate.

In the first to third embodiments, the dental intraoral device according to the present disclosure is applied to the orthodontic aligner 20 to be worn within the oral cavity to cover the teeth 10 of the upper jaw 16. However, the dental intraoral device according to the present disclosure may also be applied to an orthodontic aligner to be worn within the oral cavity to cover lower-jaw teeth.

In the first to third embodiments, the dental intraoral device according to the present disclosure is applied to the orthodontic aligner. However, the dental intraoral device according to the present disclosure is not limited to the orthodontic aligner and may be applied to a device or the like to be worn to cover teeth, such as an orthodontic retainer, a dental intraoral device for gnashing prevention, an oral appliance for the treatment of sleep apnea syndrome, a dental intraoral device for whitening, a mouth guard for sports, and a denture device (a complete denture, a partial denture).

In the case that the denture base used for the denture and/or the oral appliance (OA) for treatment of sleep apnea syndrome, the thickness of the base portion may be in a range from 0.05 [mm] or more to 2.0 [mm] or less. The thickness of the base portion may be preferably 1.0 [mm] or less, more preferably 0.8 [mm] or less, and yet more preferably 0.7 [mm] or less.

In the case of the denture base, particularly the partial base, it is preferable to form a clasp portion and a midline portion, which are prone to breakage, by the unit regions having the denser configurations. By introducing the mesh structure, the unit regions having the denser configurations in such portions, it is possible to make it easy to bend and difficult to break. The clasp portion may be in the shape of a hook shape, a cylinder shape, or the like.

The invention claimed is:

1. A dental intraoral device that is worn within an oral cavity, comprising:
   crown portions that are formed in a recessed groove shape configured to cover tooth crowns, and
   a base portion that is made of a resin, connects palatal-side edges of the crown portions, the base portion comprising a first lateral portion, a second lateral portion, an anterior portion extending between the first and second lateral portions, and a palatal section extending posteriorly from the anterior portion and medially from the first and second lateral portions such that a posterior edge of the base portion extends transversely between the first lateral portion and the second lateral portion and along a posterior edge of the palatal section,
   wherein the base portion is formed to follow the shape of an upper jaw and has a predetermined thickness, and
   wherein at least a part of the base portion is formed into a mesh shape with a plurality of through-holes penetrating the dental intraoral device such that saliva and heat are transmitted to the upper jaw.

2. The dental intraoral device according to claim 1, wherein the part of the base portion is formed by approximately regularly arranging unit regions.

3. The dental intraoral device according to claim 2, wherein a cross-sectional shape of each of the unit regions is formed by a figure that can realize a tessellation.

4. The dental intraoral device according to claim 2, wherein a cross-sectional shape of each of the unit regions is formed by a polygon that can realize a tessellation.

5. The dental intraoral device according to claim 2, wherein a cross-sectional shape of each of the unit regions is formed by a regular polygon that can realize a tessellation.

6. The dental intraoral device according to claim 2, wherein a cross-sectional shape of each of the unit regions is formed by a polygon that can realize a tessellation with one type of the polygon.

7. The dental intraoral device according to claim 2, wherein a cross-sectional shape of each of the unit regions is formed by a regular polygon that can realize a tessellation with one type of the polygon.

8. The dental intraoral device according to claim 2, wherein the unit region is formed by a three-dimensional shape that can realize space-filling.

9. The dental intraoral device according to claim 2, wherein the unit region is formed by a polyhedron that can realize space-filling.

10. The dental intraoral device according to claim 2, wherein the unit region is formed by a uniform polyhedron that can realize space-filling.

11. The dental intraoral device according to claim 2, wherein the unit region is formed by a polyhedron that can realize space-filling with one type of the polyhedron.

12. The dental intraoral device according to claim 2, wherein the unit region is formed by a uniform polyhedron that can realize space-filling with one type of the polyhedron.

13. The dental intraoral device according to claim 2, wherein a front part of the base portion is formed by the unit regions having higher rigidity than other parts of the base portion,
wherein the front part is a part of the base portion close to the crown portions covering anterior teeth.

14. The dental intraoral device according to claim 2, wherein a length of each side of each of the unit regions is 0.1 mm or more.

15. A method for manufacturing the dental intraoral device according to claim 1, the method comprising:
generating three-dimensional data of the dental intraoral device; and
modeling the dental intraoral device by a three-dimensional modeling device based on the three-dimensional data.

16. The dental intraoral device according to claim 1, wherein the thickness of the base portion is in a range from 0.05 to 0.8 mm.

17. The dental intraoral device according to claim 1, wherein the part of the base portion is formed by approximately regularly arranging unit regions, and
a ratio L/T of a thickness T of a side wall of the unit region to a length L of each side of the unit region is from 1.25 to 50.

18. The dental intraoral device according to claim 13, wherein the unit regions of the front part of the base portion are formed with smaller shapes than the unit regions of other parts of the base portion.

19. The dental intraoral device according to claim 13, wherein a thickness of each side wall of the unit regions of the front part of the base portion is thicker than a thickness of each side wall of the unit regions of other parts of the base portion.

20. The dental intraoral device according to claim 1, wherein an entirety of the base portion formed into the mesh shape.

* * * * *